No. 675,780. Patented June 4, 1901.
W. H. LUCAS.
SAW SHARPENING MACHINE.
(Application filed Oct. 7, 1899.)
(No Model.) 2 Sheets—Sheet 1.

Witnesses:-
Robert S. Blake
F. E. Bechtold

Inventor:-
William H. Lucas.
by his Attorneys:-
Howson & Howson

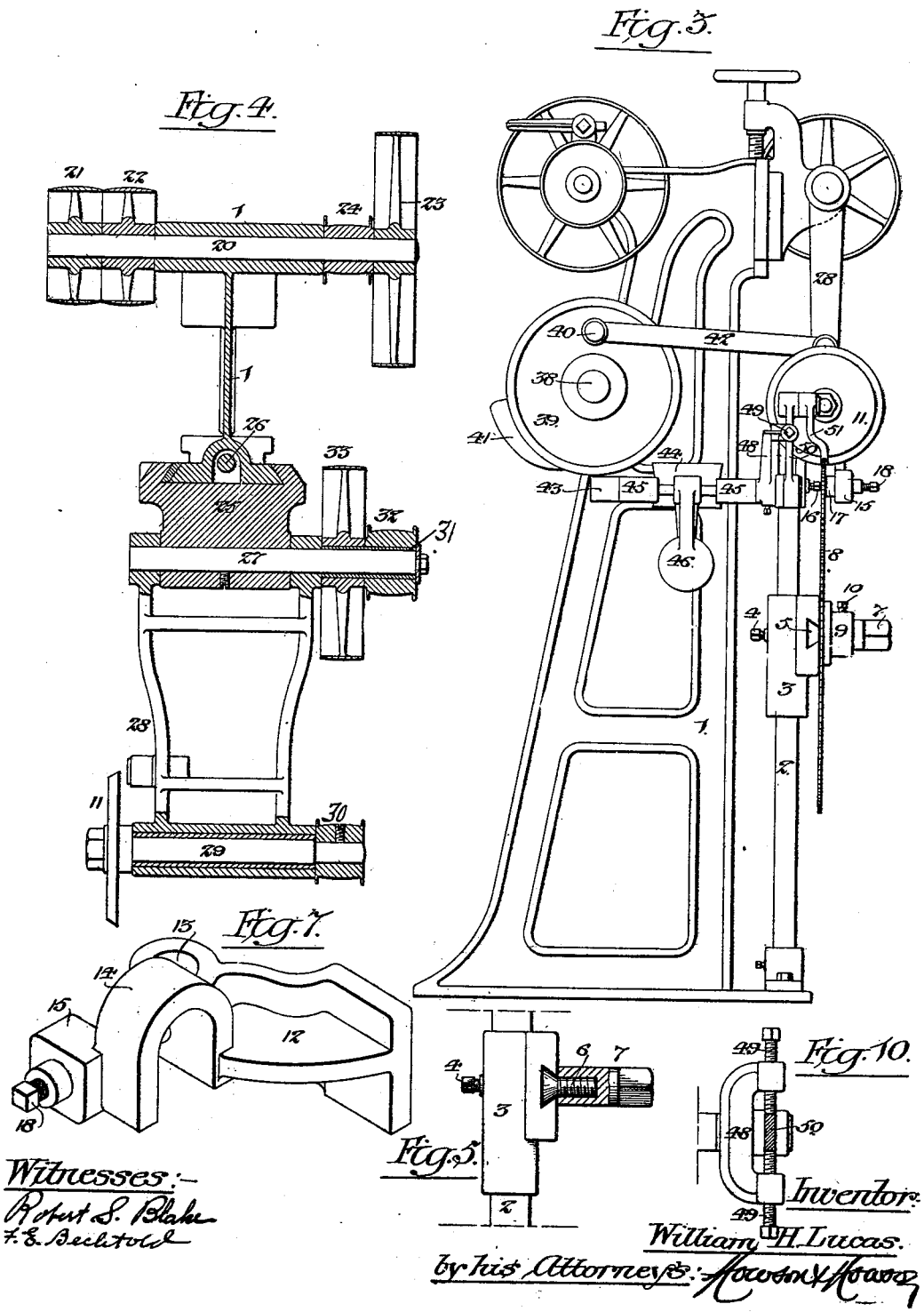

UNITED STATES PATENT OFFICE.

WILLIAM H. LUCAS, OF PHILADELPHIA, PENNSYLVANIA, ASSIGNOR TO HIMSELF, FREDERICK H. GLIEM, AND JOHN P. MATHIEU, TRADING AS LUCAS AND GLIEM MACHINE WORKS, OF SAME PLACE.

SAW-SHARPENING MACHINE.

SPECIFICATION forming part of Letters Patent No. 675,780, dated June 4, 1901.

Application filed October 7, 1899. Serial No. 732,929. (No model.)

*To all whom it may concern:*

Be it known that I, WILLIAM H. LUCAS, a citizen of the United States, residing in Philadelphia, Pennsylvania, have invented certain Improvements in Saw-Sharpening Machines, of which the following is a specification.

My invention consists of a machine for automatically sharpening the teeth of saws, milling-cutters, and the like, the features of construction or combinations of parts forming the subject of my invention being fully set forth and specifically claimed hereinafter.

Figure 1:
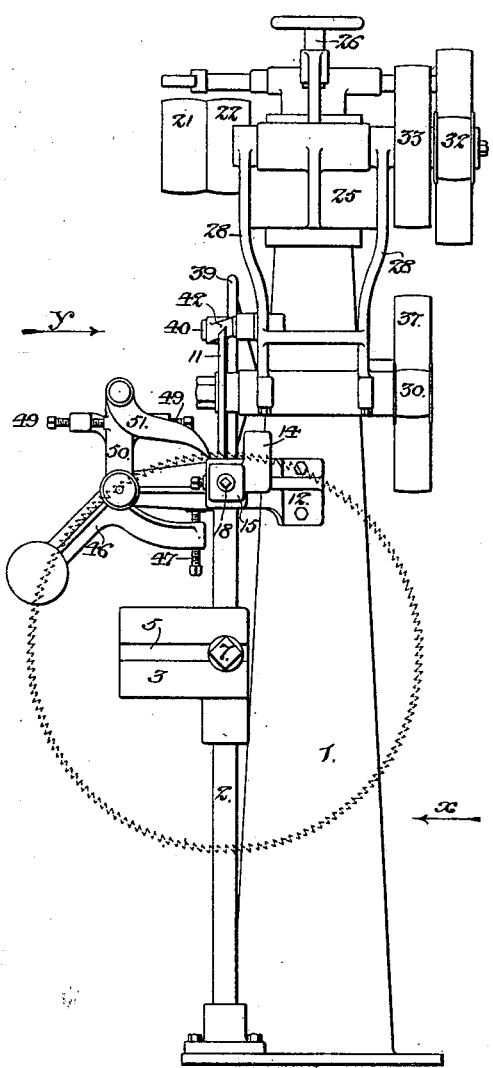
Figure 2:
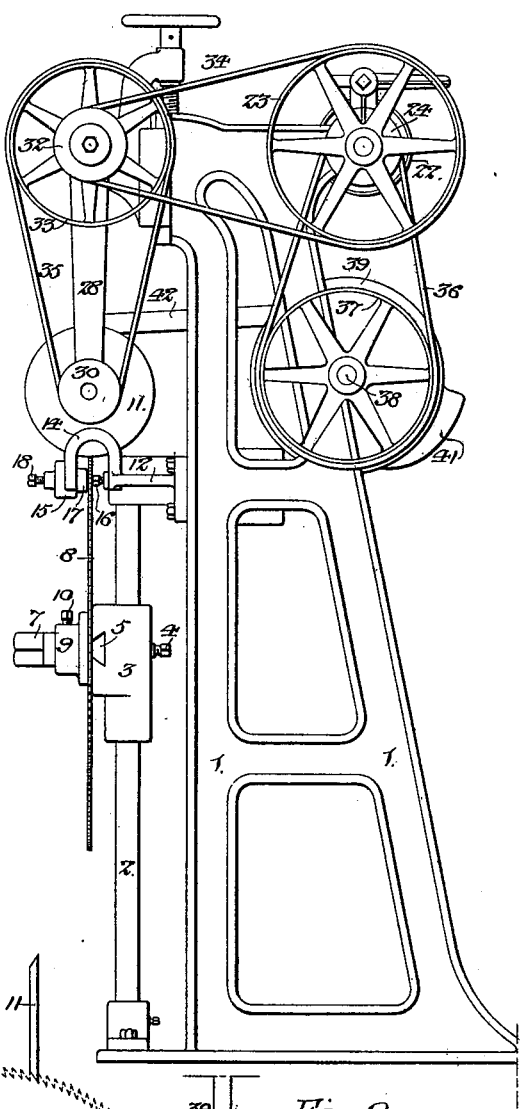

In the accompanying drawings, Figure 1 is a front view of my improved sharpening-machine, the saw being shown by dotted lines. Fig. 2 is an end view of the machine looking in the direction of the arrow *x*, Fig. 1, and showing the saw in full lines. Fig. 3 is an end view of the machine looking in the direction of the arrow *y*, Fig. 1, and also showing the saw in full lines. Fig. 4 is a sectional plan view slightly enlarged and showing in an extended position a certain swinging frame forming part of the machine; and Figs. 5 to 10, inclusive, are views illustrating features of construction not clearly shown in the main views of the drawings.

1 represents a fixed vertical frame or standard, in front of which is a vertical rod or post 2, securely confined to the base of the frame and serving for the support and guidance of a saw-carrying slide 3, which may be secured in any desired position of vertical adjustment by means of a set-screw 4 and which has in its front face a transverse dovetailed slot 5, to which is adapted the beveled head of a bolt 6, said bolt receiving a nut 7, which bears upon the front face of the slide 3 and serves to secure the bolt 6 in any desired position of transverse adjustment in the slot 5. (See Fig. 5.) A portion of the nut 7 is rounded, so as to enter the eye of a saw 8, and thus serve as a support therefor, a collar 9, slipping over the circular portion of the nut 7 and secured thereto by a set-screw 10, serving to confine the saw in position without interfering with the free rotation of the same upon the nut, which thus serves as a pivot-stud for the saw.

The object of providing the saw-carrying slide 3 with a transverse slot is to provide for lateral adjustment of the saw-carrying stud in respect to the rotary cutter 11, whereby the sharpening of the saw is effected, and thus impart any desired degree of undercut to the teeth of the saw. For instance, as shown in Fig. 1, the saw-carrying stud is vertically in line with the cutter and the teeth are formed without any undercut, while in Fig. 6 the saw-carrying stud is shown as adjusted laterally, so as to occupy a position some distance to the left of the cutter, whereby considerable undercut is imparted to the teeth. Where such provision for variable undercut is not desired, a stud projecting from the slide 3 in fixed relation to the cutter 11 may be employed.

Secured to the upright frame or standard 1 is a bracket 12, Fig. 7, this bracket having an eye 13 and a yoke 14, the outer leg of which carries a block 15. The eye 13 of the yoke receives and steadies the upper end of the vertical rod 2, and a stud in front of said eye carries a set-screw 16, which bears against the saw at a point adjacent to that portion of the toothed edge of the same which is acted upon by the cutting wheel or disk 11.

Figures 6, 8, 9:
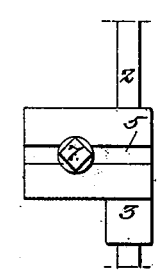

The yoke 14 bridges the saw, and the block 15 on the outer leg of said yoke serves as a guide for a sliding block or plug 17, which can be acted upon by a set-screw 18, Fig. 8, so as to be pressed against the outer face of the saw at a point in line with the set-screw 16, thus providing a clamp through which the saw can move, but which holds said saw at a point close to the tooth which is being sharpened, thereby eliminating the element of inaccuracy in cutting as well as injury to the saw-blade, which may result from the springing of said blade under the action of the cutting wheel or disk when the blade is supported only at the center.

The upper end of the frame 1 has a bearing for a transverse shaft 20, which has at one end fast and loose pulleys 21 and 22 for receiving the driving-belt and at the other end a pair of pulleys 23 and 24, secured to the shaft, so as to rotate therewith.

To suitable guides on the front of the frame 1 is adapted a sliding head 25, which can be raised and lowered by means of an adjusting-screw 26, a shaft 27 being secured to this sliding head 25 and projecting from both ends of the same. To opposite projecting portions of this shaft is hung the upper end of a swinging frame 28, which has at its lower end a bearing for a shaft 29, said shaft carrying at one end the cutting wheel or disk 11 and having secured to its opposite end a pulley 30. One of the projecting ends of the shaft 27 also has loosely mounted upon it a sleeve 31, to which are secured two pulleys 32 and 33, the pulley 32 receiving a belt 34 from the pulley 23 on the driving-shaft 20, while the pulley 33 drives a belt 35, which is adapted to the pulley 30 on the cutter-shaft 29. The pulleys 23 and 33 are larger in diameter than the pulleys 32 and 30. Hence rotative movement at high speed is imparted to the cutter-shaft 29, and as the pulleys 32 and 33 have the same axis as the swinging frame 28, which carries said cutter-shaft, swinging movement of said frame does not interfere with the proper and continuous driving of the cutter-shaft.

Vertical adjustment of the slide 3 upon the rod 2 adapts the machine for operation upon saws of different diameters, and the vertical adjustment of the head 25 provides for the use of cutting wheels or disks of different diameters, as will be readily understood.

The pulley 24 on the driving-shaft drives a belt 36, which is adapted to a pulley 37 on a shaft 38, adapted to suitable bearings at the back of the frame 1, and this shaft has at its opposite end a wheel or disk 39 with projecting crank-pin 40 and peripheral cam 41. The crank-pin 40 is connected by a rod or link 42 to the swinging frame 28, so that as the disk 39 is rotated swinging movement will be imparted to said frame 28 and the cutting wheel or disk 11 will be carried back and forth across the toothed edge of the saw. The cam 41 acts, as shown in Fig. 9, upon an antifriction-roller carried by an arm 43 on a rock-shaft 44, which is adapted to suitable bearings 45 at one end of the frame 1 and has a weighted lever 46, one arm of said lever carrying a set-screw 47, which by contact with a suitable stop on the fixed frame serves to limit the approach of the arm 43 toward the periphery of the wheel or disk 39, and consequently governs the extent of movement imparted to said arm by the cam 41 on each rotation of said wheel or disk 39.

Secured to the rock-shaft 44 is an arm 48, forked at its upper end, each limb of the fork carrying a set-screw 49, as shown in Figs. 1 and 10, these set-screws bearing upon the opposite sides of an arm 50, which is hung so as to swing freely upon the forward end of the rock-shaft 44 and carries a pivoted pawl 51, adapted to engage with the teeth of the saw which is being acted upon. Rocking movement transmitted to the arm 48 is therefore communicated to the arm 50, and the pawl 51 is caused to turn the saw forward tooth by tooth, such feeding movement of the saw being effected after the cutting-disk 11 has been moved out of engagement with the teeth and the extent of feeding movement being regulated to accord with the size of the teeth by adjustment of the set-screw 47, whereby the extent of rocking movement of the shaft 44 under the action of the cam 41 is governed.

By the employment of the set-screws 49 the pawl-carrying arm 50 can be adjusted in respect to the arm 48 of the rock-shaft so as to accurately determine the forward limit of throw of the pawl 51, and thereby insure the accurate presentation of the successive teeth to the swinging cutter 11.

The saw-clamp provided by the set-screw 16 and plug 17 acts also as a friction-brake to prevent the saw being carried forward by momentum to a position beyond that to which it is pushed by the action of the pawl 51.

Having thus described my invention, I claim and desire to secure by Letters Patent—

1. The combination, in a saw-sharpening machine, of a rotary cutter, a slide carrying a pivot-stud for the saw, a vertical rod upon which said slide is mounted, and a bracket serving as a brace or stay for the upper end of said rod, said bracket also carrying a clamp for engaging with the saw-blade adjacent to that portion of its toothed edge upon which the cutter acts, substantially as specified.

2. The combination, in a saw-sharpening machine, of a pivot-stud for the saw, a rotary cutter for acting upon the teeth of the saw, a swinging arm carrying said cutter, a head to which said swinging arm is pivoted, vertical guides for said head on the fixed frame of the machine and means for vertically adjusting said head on said guides, substantially as specified.

3. The combination, in a saw-sharpening machine, of a pivot-stud for the saw, a rotary cutter for acting on the teeth of the saw, said cutter being movable into and out of engagement with said teeth, a pawl for acting upon the teeth of the saw so as to intermittently move the same, an arm carrying said pawl, a rock-shaft having an arm thereon, means for effecting relative adjustment of the same and the pawl-carrying arm, and means for rocking the shaft, substantially as specified.

4. The combination, in a saw-sharpening machine, of a pivot-stud for the saw, a rotary cutter for acting on the teeth of the saw, said cutter being movable into and out of engagement with said teeth, a pawl acting upon the teeth of the saw to intermittently feed the same forward, a pawl-carrying arm, a rock-shaft for operating the same, a disk having a peripheral cam thereon, an arm on the rock-shaft adapted to be actuated by said cam, and another arm on said rock-shaft having a set-screw serving as a stop whereby the extent of rocking movement imparted to the shaft by said cam may be regulated, substantially as specified.

5. The combination, in a saw-sharpening machine, of a pivot-stud for the saw, a rotary cutter for acting on the teeth of the saw, said cutter being movable into and out of engagement with said teeth, a feed-pawl for engaging with the teeth of the saw, a rock-shaft for operating said pawl, a wheel or disk having a peripheral cam, an arm on the rock-shaft projecting into the path of said cam, and a lever on the rock-shaft, one arm of said lever being weighted and the other arm having a set-screw serving as a stop whereby the extent of movement imparted to the shaft by the cam is regulated, substantially as specified.

6. The combination, in a saw-sharpening machine, of a pivot-stud for the saw, a rotary cutter for acting on the teeth of the saw, a swinging frame carrying said cutter, a feed-pawl engaging the teeth of the saw, a rock-shaft for operating said feed-pawl, and a wheel or disk having a crank-pin and a peripheral cam, said crank-pin being connected to the swinging cutter-carrying frame and the cam acting upon the pawl-operating rock-shaft, substantially as specified.

In testimony whereof I have signed my name to this specification in the presence of two subscribing witnesses.

WM. H. LUCAS.

Witnesses:
F. E. BECHTOLD,
JOS. H. KLEIN.